No. 611,935. Patented Oct. 4, 1898.
J. POOLE.
PROCESS OF AND APPARATUS FOR TREATING ORE TAILINGS.
(Application filed Aug. 16, 1897.)
(No Model.) 4 Sheets—Sheet 2.

Witnesses
J. G. Hinkel
E. Harrener

Inventor
John Poole
By
Foster Freeman
Atty

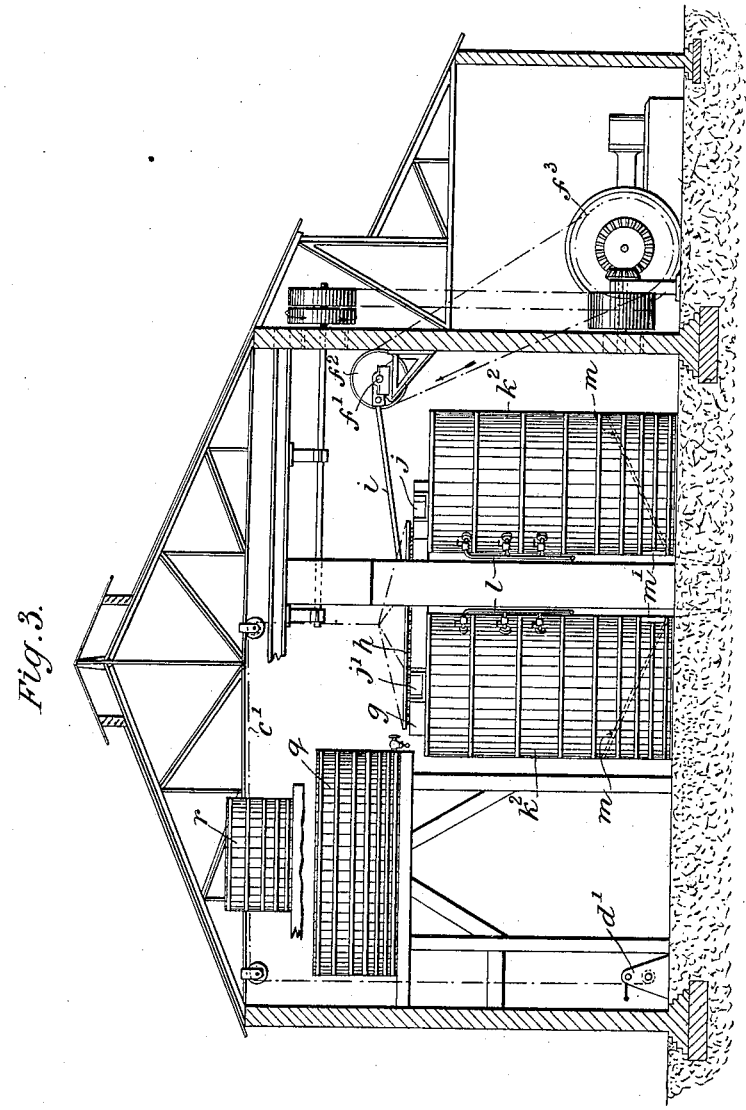

No. 611,935. Patented Oct. 4, 1898.
J. POOLE.
PROCESS OF AND APPARATUS FOR TREATING ORE TAILINGS.
(Application filed Aug. 16, 1897.)
(No Model.) 4 Sheets—Sheet 4.
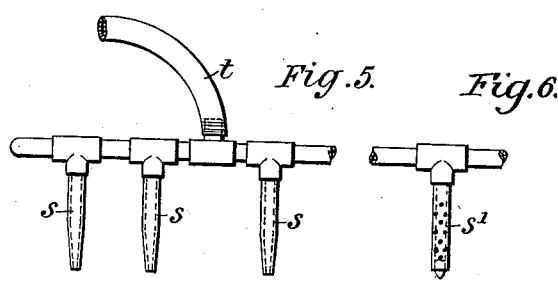
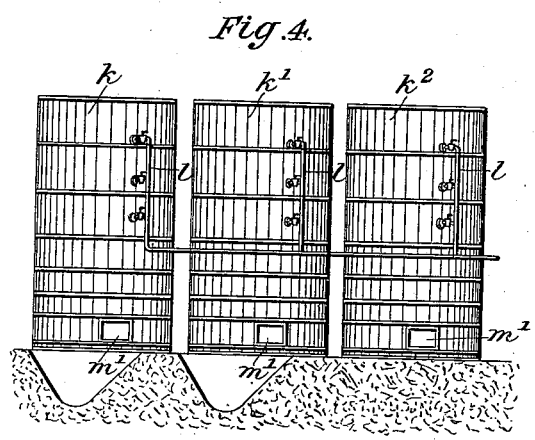
Witnesses
Inventor
John Poole

UNITED STATES PATENT OFFICE.

JOHN POOLE, OF LONDON, ENGLAND.

PROCESS OF AND APPARATUS FOR TREATING ORE-TAILINGS.

SPECIFICATION forming part of Letters Patent No. 611,935, dated October 4, 1898.

Application filed August 16, 1897. Serial No. 648,429. (No model.)

*To all whom it may concern:*

Be it known that I, JOHN POOLE, a subject of the Queen of Great Britain, residing at London, England, have invented certain new and useful Improvements in the Treatment of Ore-Tailings and the Like and Apparatus Therefor, the invention being also in part adapted for the treatment of sewage, of which the following is a specification.

My invention relates to improvements in the treatment of pulverized ores and to apparatus therefor, the invention being particularly applicable to gold and silver bearing ores, tailings, slimes, and the like which are to be treated by cyanid or other like gold and silver solvent solutions, the invention being also in part adapted for the treatment of sewage.

In the accompanying drawings is illustrated apparatus forming part of my invention and for carrying same into effect.

Figure 1:
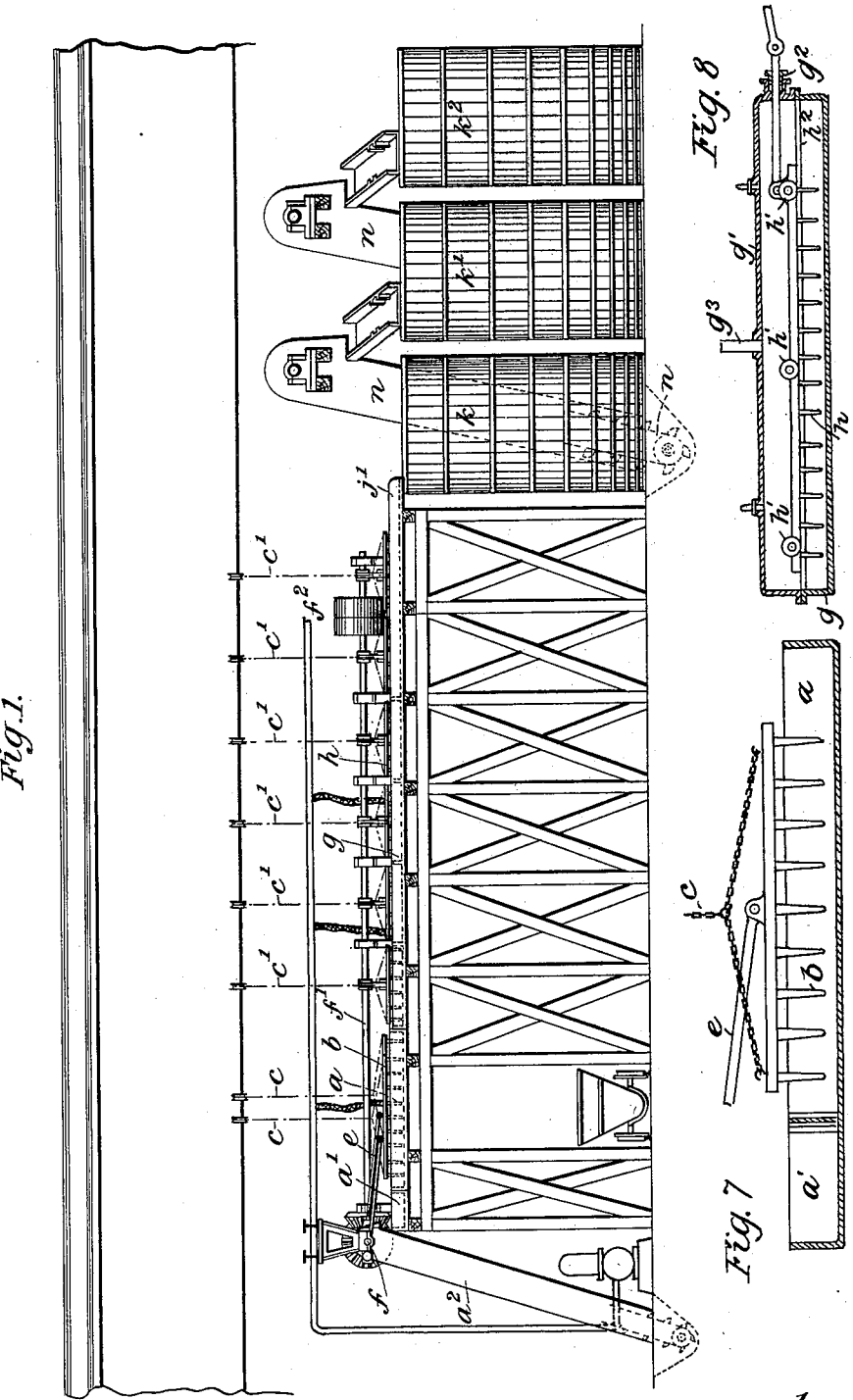
Figure 2:
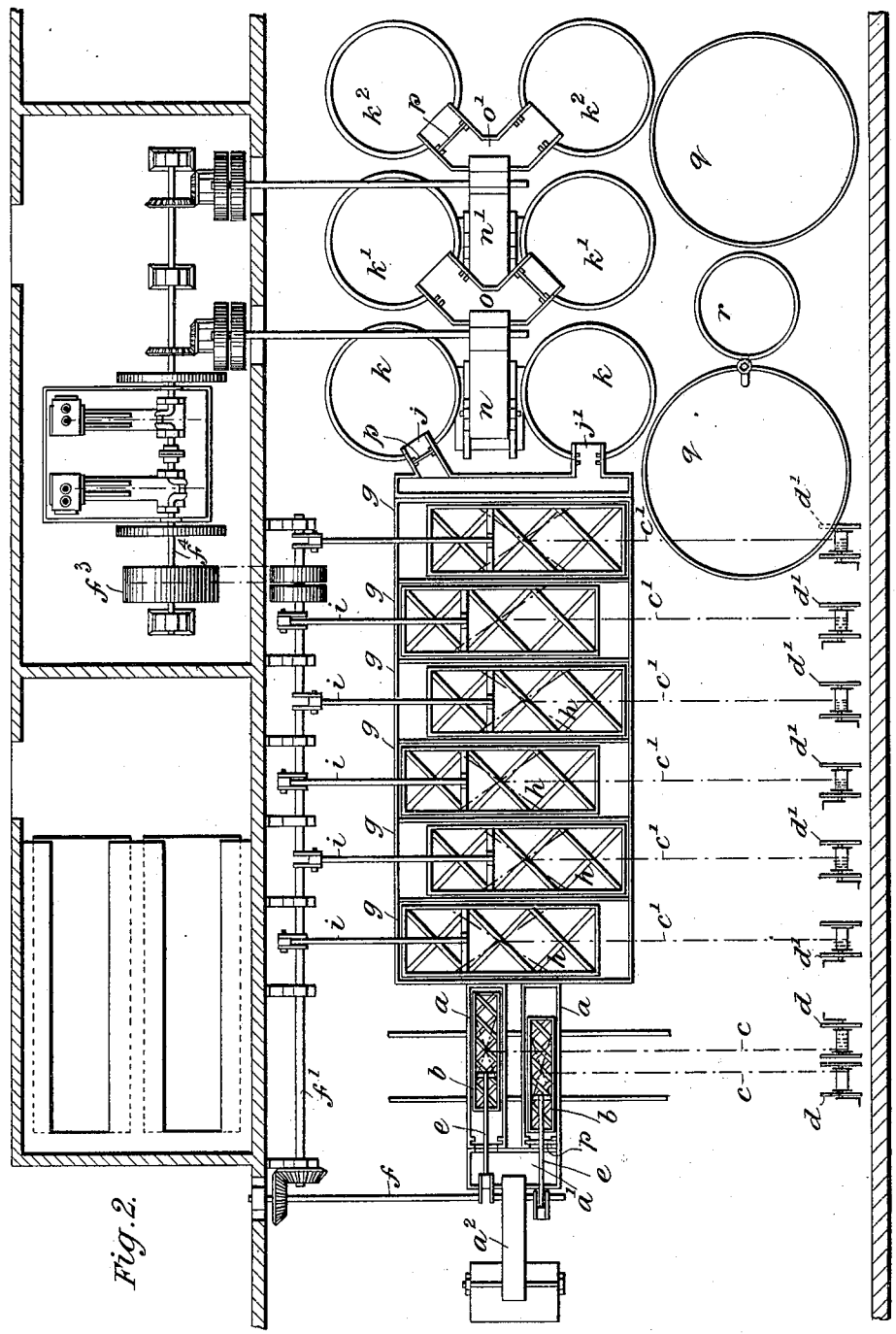

In the drawings, Figure 1 is an elevation of the apparatus. Fig. 2 is a plan. Fig. 3 is an end view looking from the right hand. Fig. 4 is a part elevation of one set of the settling-tanks employed. Fig. 5 is an elevation on an enlarged scale showing one form of the raking or harrow teeth, and Fig. 6 is an elevation showing another form of tooth. Fig. 7 is a longitudinal vertical view, on an enlarged scale, to show better a rake or harrow and a bath. Fig. 8 is a similar view showing a modification of the rakes and bath.

The apparatus is shown as arranged in a suitable covered building; and it consists of one, two, or more shallow tray-like baths $a$, connected at their ends with a common bath $a'$, with which communicates a conveyer or bucket belt $a^2$. In the baths $a$ are rakes or harrows $b$, Fig. 7, preferably suspended by flexible connections $c$, such connections, which may be cords, chains, or the like, passing over pulleys and down to winches or other mechanism $d$, by which the harrows may be raised or lowered to suit the amount or quality of material in the bath, such harrows being preferably always suspended so that they do not touch the bottom and capable of being raised when required to empty the bath.

A reciprocating movement is given to the harrows by means of the pitmen $e$, connected to the cranks of a shaft $f$, which is suitably rotated from a shaft $f'$, driven by a pulley $f^2$ from a pulley $f^3$ on a main shaft $f^4$, driven by suitable engines or motors.

At the ends of the baths $a$ are situated a series of similar shallow tray-like baths $g$ of larger dimensions, provided also with harrows or rakes $h$, hung on flexible connections $c'$, attached to winches $d'$, such rakes being operated by pitmen $i$, connected to cranks on the shaft $f'$. These baths are preferably placed at a slight incline toward one end, where there are situated overflow-chutes $j\ j'$, which overhang, respectively, the end tanks of a series of settling-tanks $k\ k'\ k^2$. These tanks are each provided with pipes $l$, draining into a pipe common to all such pipes $l$, having cocks at different heights placed on the tanks and communicating therewith. The tanks have also sloping bottoms (indicated at $m$, Fig. 3) communicating with doors $m'$, while between each pair of tanks $k\ k$ or $k'\ k'$ is a sump or pit in which works an endless conveyer or bucket belt $n\ n'$, arranged to deliver into troughs or launders $o\ o'$, having each two spouts or branches passing to the tanks $k'\ k'$ and $k^2\ k^2$, respectively. Such spouts are provided with dams or doors $p$, as are also the chutes $j\ j'$ and baths $a\ a'$. There are provided also suitable tanks $q\ q$ and $r$ for the mixing and storage of the cyanid or other dissolving working solutions.

The teeth $s$ of the rakes or harrows may be solid or hollow throughout their length and open at their ends, as shown in Fig. 5, or they may be perforated, as at $s'$, Fig. 6, such teeth being connected through pipes with a flexible tube $t$, by which air, liquid, or gases may be forced or introduced into the body or mass of material in the baths.

In carrying out the process the tailings, slimes, pulp from the mill, sands, alluvial or other matter to be treated and in a more or less finely-divided state are elevated by the conveyer $a^2$ into the bath $a'$, supplied with water, and from thence overflows into the baths $a$, where it is subjected to a raking action in the water by the harrows. In these baths $a$ any free gold present has an opportunity to settle. If clean and free milling ores are being treated, quicksilver may be placed in the bath to amalgamate the gold. The rest of the pulp is allowed to gradually flow over the ends or edges of the baths into the first bath or vat $g$, in which the pulp or tailings are treated with cyanid, bromin, chlorin, or other desired solutions and which are continuously supplied to same. These baths are so arranged that the pulp and solution flow over the edge of the first one into the one next in order, the agitation to which they are subjected and the large surface which is exposed by reason of the formation of the baths enabling the pulp, with cyanid or like solution, to be brought very effectively into contact with the air. In these baths the fine gold is dissolved, and from them the tailings and solution flow by the chutes $j$ or $j'$ into the tanks $k\ k$, where in due course the gold-bearing solution is drawn off by the pipes $l$ and taken to the usual extractor-boxes, where it is treated in the ordinary way. The tailings remain at the bottom of the tank $k$ until the door $m'$ is opened, when they are discharged into the sump, in which works the conveyer $n$, which will raise the tailings and deliver them into the launder $o$, and from thence into the next tanks $k'\ k'$. This launder $o$ may have a studded or ribbed bottom to break up the material and will have a weak cyanid or like solution or water-wash supplied to it. In the first tank the tailings may be deprived of, say, fifty per cent. of the precious metals, and in the second tank, which also contains a cyanid or like solution, they will be deprived of, say, fifty per cent., or one-half, of the precious metals remaining therein, after which the same process may be repeated, the tailings being removed and elevated to the third tanks $k^2\ k^2$, and so on, as required to obtain as far as possible all the precious metals contained therein, any suitable number or arrangement of tanks being employed, about one-half of the remaining precious metals in the tailings being extracted at each operation.

The tanks may be so arranged that one set are being used for settling while another set are being emptied of solution and tailings, as previously described, this being effected by the dams or doors $p$.

By the means above described the coarse as well as the greater portion of the fine gold may be obtained within a few hours of crushing, the remainder being afterward secured. The water required is considerably less than that used in battery-treating and the loss but little more than the moisture in the residues. The quantity required in the agitation can be as low as equal weight of tailings or slimes, while the strength of the solution will vary with the ore; but, for example, 0.01 per cent. will work with some slimes.

In treating slimes direct and tailings carrying very fine gold they may be delivered into the large baths $g$ without the intervention of the first bath $a$.

All free-milling ores, sands, and tailings may be leached, as formerly, after the agitation, as above described, wherever suitable.

Where it is desired to use chlorin-gas or the like under pressure, the baths $g$ may be provided with gas-tight covers $g'$ and have suitable packing-boxes $g^2$, through which the parts operating the agitating-harrows work. The gas is introduced through a pipe $g^3$ in the cover, and in this case the rakes $h$ are supported above the bottom of the tank by rollers $h'$, which work on a ledge $h^2$ of the bath. By this process amalgamation by copper plates and leaching of the cyanid or other solution is no longer necessary; nor is the presence of slimes to be feared, as the ore may be crushed, dry or wet, as fine as is possible in order to liberate the whole of the precious metal from the gangue. A small quantity of lime may be crushed with the ore or mixed in the first or concentrating baths $a$ for the double purpose of neutralizing the acids in the ores and for causing a quick precipitation of the solid matter in the settling-tanks. In order to remove the soluble sulfates, acids, salts, and the like, a preliminary water-wash may be necessary.

The apparatus is also adapted for treating sewage with air or chemicals and for the settling and decantation of same.

The process and apparatus is adapted for the treatment of alluvial and beach sands in a similar and direct manner without first pulverizing the wash, but by first separating the large stones, pebbles, and the like with a revolving screen or similar means and then treating the residue as for ordinary tailings.

By means of the process and apparatus above described it will be seen that a comparatively thin body of material is exposed to the action of the cyanid or like solution, that such body of material is being continuously moved, and that the solution itself has a large surface exposed to the air, all these being very desirable features in the working, particularly of the cyanid process, and that the treatment is a continuous one, the material passing through the apparatus at a rate which may be regulated by the manner in which the extraction is proceeding.

Having now particularly described and ascertained the nature of my said invention and in what manner the same is to be performed, I declare that what I claim is—

1. The herein-described process for the continuous treatment of pulps, slimes, tailings and the like, consisting in subjecting a thin body of the same to a raking or stirring action in water, allowing any free precious metal to settle therein, then passing such portions of the pulp, slimes, tailings and the like as have not settled in the first bath directly and successively into a second series of baths, and there treating them to a further raking or stirring action while continuously subjected to the action of a cyanid or like solvent solution, and causing such solvent solution to flow with the pulps, slimes, tailings, and the like throughout the second series of baths, and subsequently allowing the solid and liquid portions to settle and then separating the same, substantially as described.

2. For the continuous treatment of pulps, slimes, tailings, and the like with cyanid and similar solvent solutions and in combination, a series of shallow tray-like baths, a rake in each bath of the series, means for reciprocating the rakes, an overflow-chute at the end of the series, settling-tanks to receive the overflow from the chutes, means for separately discharging the solid and liquid contents of the tanks, conveyers adapted to raise the solid contents from one tank after discharge, a launder in which such contents are received and in which they may be further treated with a solvent solution or wash, and a further settling-tank for receiving the discharge from the launder, substantially as described.

3. For the continuous treatment of pulps, slimes, tailings, and the like with cyanid and similar solvent solutions and in combination, a series of shallow tray-like baths arranged side by side and so that the pulp and solutions flow from one to the other, a rake in each bath of the series, means for reciprocating the rakes, an overflow-chute at the end of the series, a settling-tank beneath such chute, and means for separately removing the liquid and solid contents of same, substantially as described.

In testimony whereof I have hereunto set my hand in the presence of two subscribing witnesses.

JOHN POOLE.

Witnesses:
W. M. HARRIS,
JOSEPH LAKE.